United States Patent [19]
Yeh

[11] Patent Number: 6,106,345
[45] Date of Patent: Aug. 22, 2000

[54] BODYBOARD

[76] Inventor: Tzong In Yeh, 4566 Crestwood St., Fremont, Calif. 94538

[21] Appl. No.: 09/348,823

[22] Filed: Jul. 8, 1999

[51] Int. Cl.$^7$ .................................................. B63B 1/00
[52] U.S. Cl. ................................................ 441/65; 441/74
[58] Field of Search ......................................... 441/65, 74

[56] References Cited

U.S. PATENT DOCUMENTS

| | | | |
|---|---|---|---|
| 3,952,354 | 4/1976 | Turner | 441/65 |
| 4,713,032 | 12/1987 | Frank | 441/74 |
| 5,658,179 | 8/1997 | Glydon et al. | 441/65 |
| 5,766,051 | 6/1998 | Messer | 441/65 |

*Primary Examiner*—Jesus D. Sotelo
*Attorney, Agent, or Firm*—Rosenberg, Klein & Lee

[57] ABSTRACT

A bodyboard includes a board made of expended polyethylene and a protection layer heat-laminated around the board. The protection layer has at least 0.01 mm thick and with ultraviolet inhibitor and anti-oxidant added therein. The bodyboard has a serrated surface so as to prevent the bodyboarders/surfers from slipping.

4 Claims, 11 Drawing Sheets

BODYBOARD

FIELD OF THE INVENTION

The present invention relates to a bodyboard having a protection layer heat-laminated on the outside of the board so as to protect the board made of polyethylene from corroded by sea water.

BACKGROUND OF THE INVENTION

A conventional bodyboard 10 is shown in FIG. 1 and made of expended polyethylene at a foaming rate of 20 to 30 times so that there are many "air-cells" in the board and the air-cells decide the floating feature of the board 10. An out layer 11 is bonded on the two sides of the board 10 and the out layer 11 is made of expended polyethylene at a foaming rate of 10 to 15 times. Therefore, the air-cells in the out layer are smaller than the air-cells in the board 10. Two side panels 12 are bonded to the two sides of the board 10 and the two side panels 12 are made of the same material of the out layer 11. However, the out layer 11 could be broken under the sunshine for a period of time. It is known that the ultraviolet will result the damage of the expended polyethylene. Once the air-cells in the out layer are broken, water will retained in the dents formed by the broken air-cells to reduce the floating feature. Furthermore, the patterns on the bodyboard can only be printed on the out layer 11 and the patterns will be faded under the sunshine quickly.

FIG. 2 shows that three out layers 111, 112, 113 are respectively bonded on the outside of the bodyboard 10 so as to provide three different colors on the outside of the bodyboard 10. Nevertheless, a long gap 14 (see FIG. 3) will be defined between two adjacent out layers 111, 112, 113. Therefore, there will be two black lines between the three out layers 111, 112, 113 on the outside of the bodyboard 10 because dirt and scum are retained in the long gaps 14. Furthermore, the gap results in de-lamination of the three out layers 111, 112, 113.

The present invention intends to provide a bodyboard which has a protection layer on the outside of the board and the protection layer is a plastic layer in which ultraviolet inhibitor and anti-oxidant are added so as to keep the protection layer to be fresh for a long time.

SUMMARY OF THE INVENTION

The present invention provides a bodyboard comprising a board made of expended polyethylene and a protection layer heat-laminated on the outside of the board. The protection layer is added with ultraviolet inhibitor and anti-oxidant.

The primary object of the present invention is to provide a bodyboard which has a protection layer permanently bonded to the board and ultraviolet inhibitor and anti-oxidant are added in the protection layer.

Another object of the present invention is to provide a bodyboard having a protection layer wherein the bodyboard has a serrated surface for preventing the bodyboarders/surfers from slipping.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
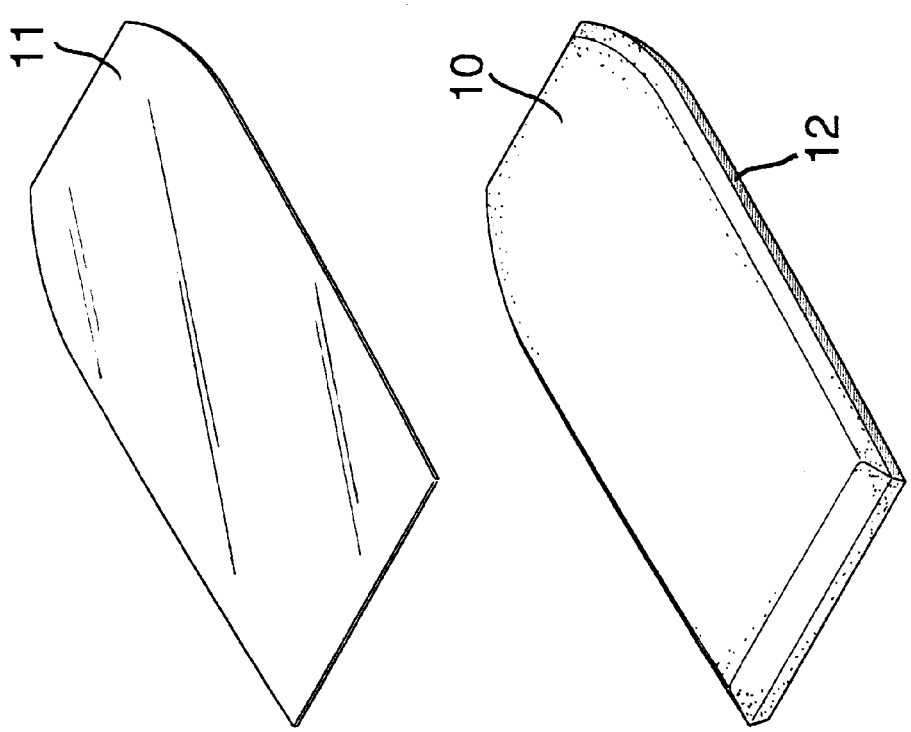
FIG. 1 is an exploded view of an out layer and a conventional bodyboard.
Figure 2:
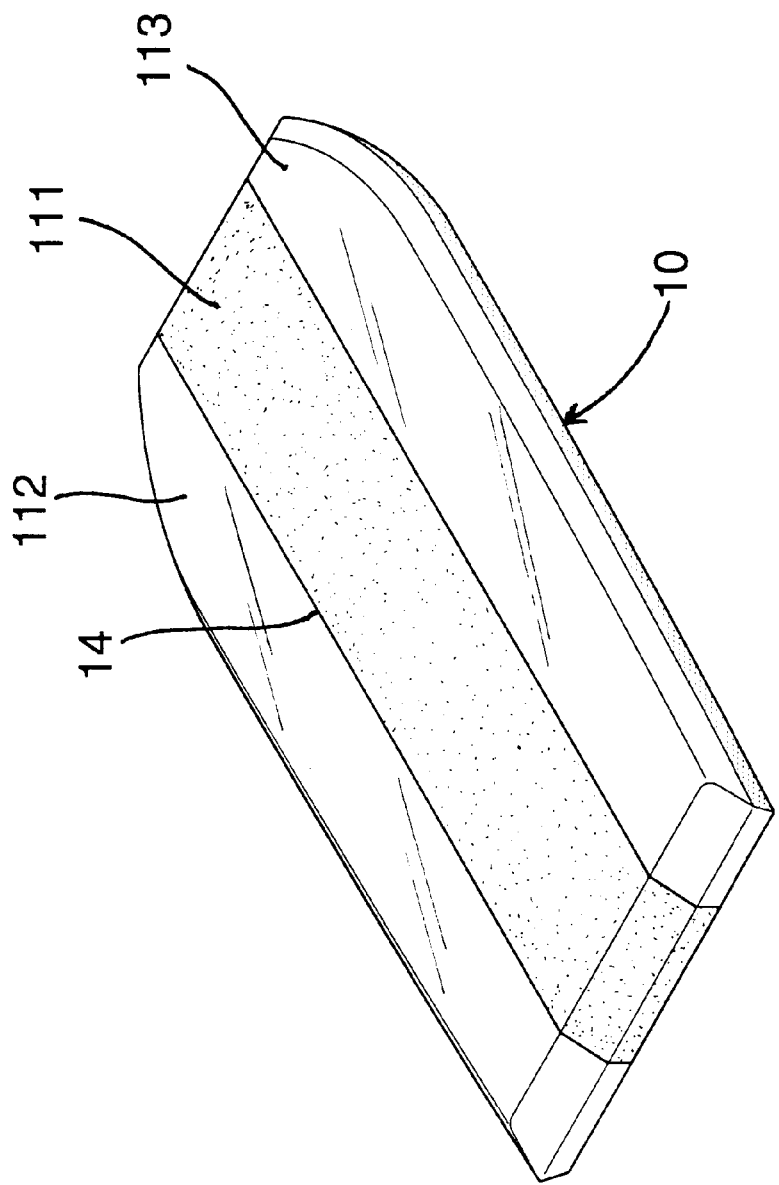
FIG. 2 is a perspective view of another conventional bodyboard.
Figure 3:
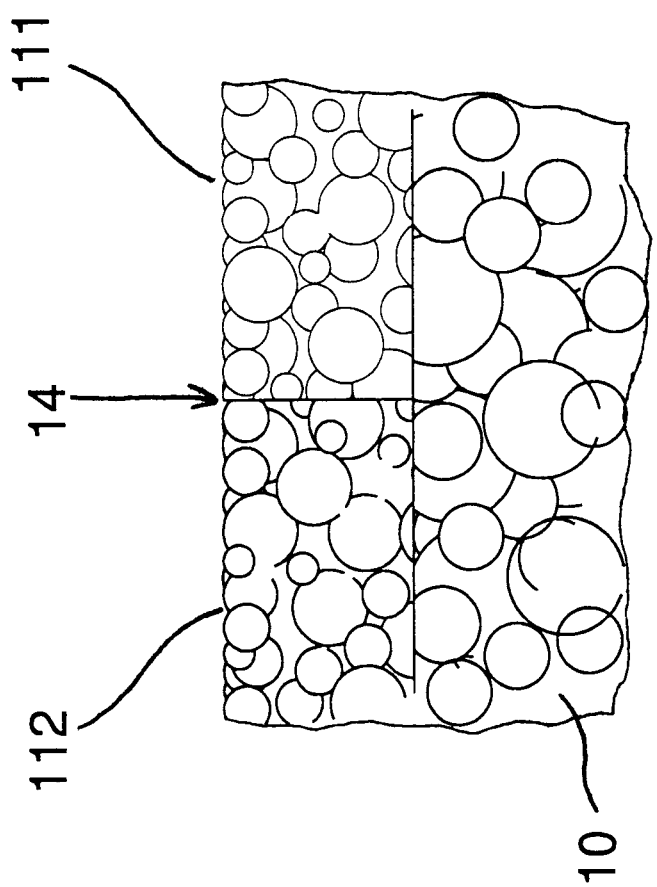
FIG. 3 is a partial cross-sectional view to show a gap is defined between two adjacent out layers on the conventional bodyboard as shown in FIG. 2.
Figure 4:
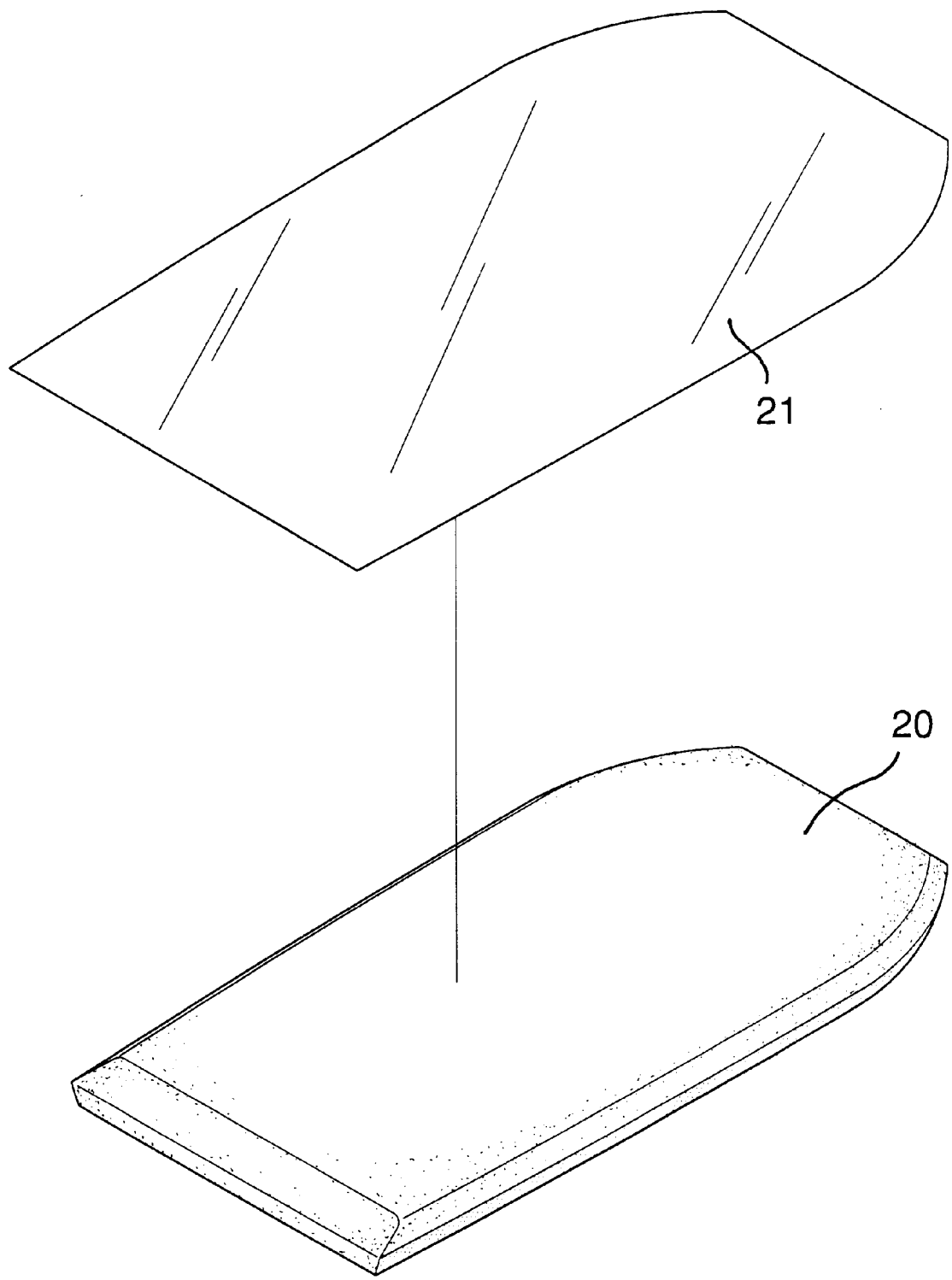
FIG. 4 is an exploded view of the protection layer and the bodyboard in accordance with the present invention.
Figure 5:
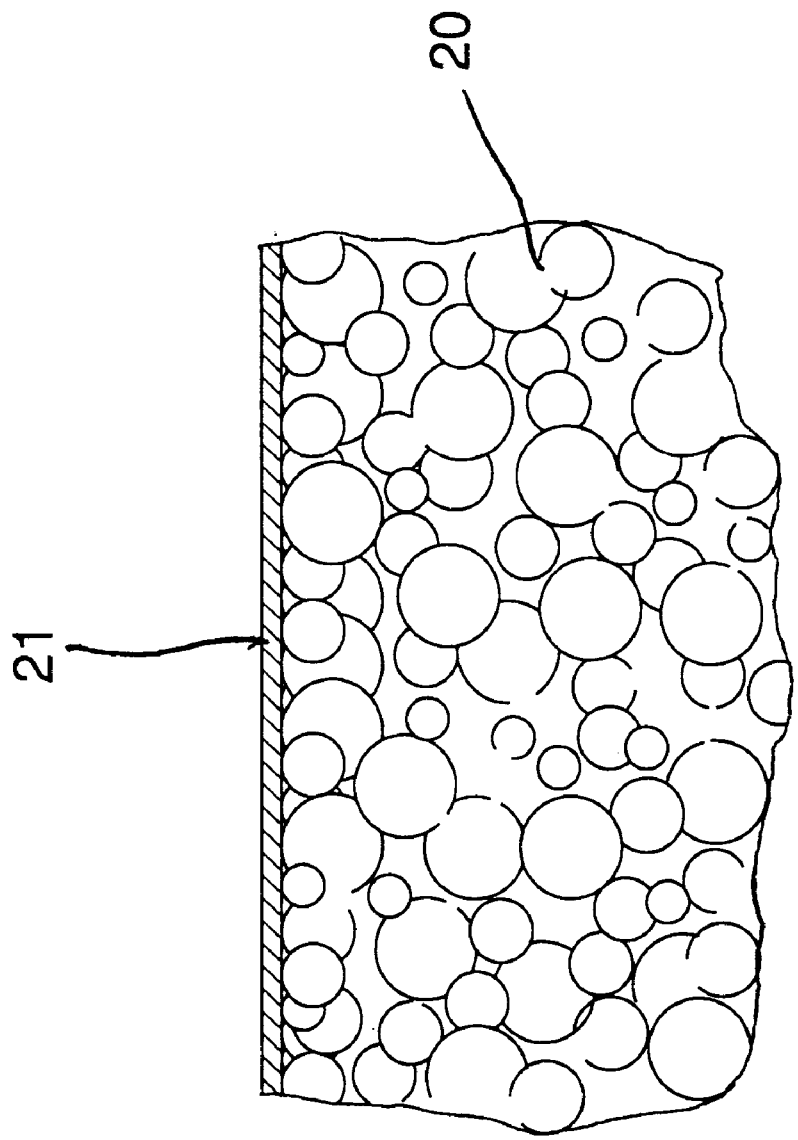
FIG. 5 is a partial cross-sectional view to show the protection layer on the board of the present invention.

Referring to FIGS. 4 and 5, the bodyboard in accordance with the present invention comprises a board 20 made of expended polyethylene and a protection layer 21 which is a plastic layer is heat-laminated on the outside of the board 20, wherein the protection layer 21 is added with ultraviolet inhibitor and anti-oxidant. The protection layer 21 is at least 0.01 mm thick which protects the board from contacting the water, the dirt, scum and the ultraviolet from sunshine.

Figure 6:
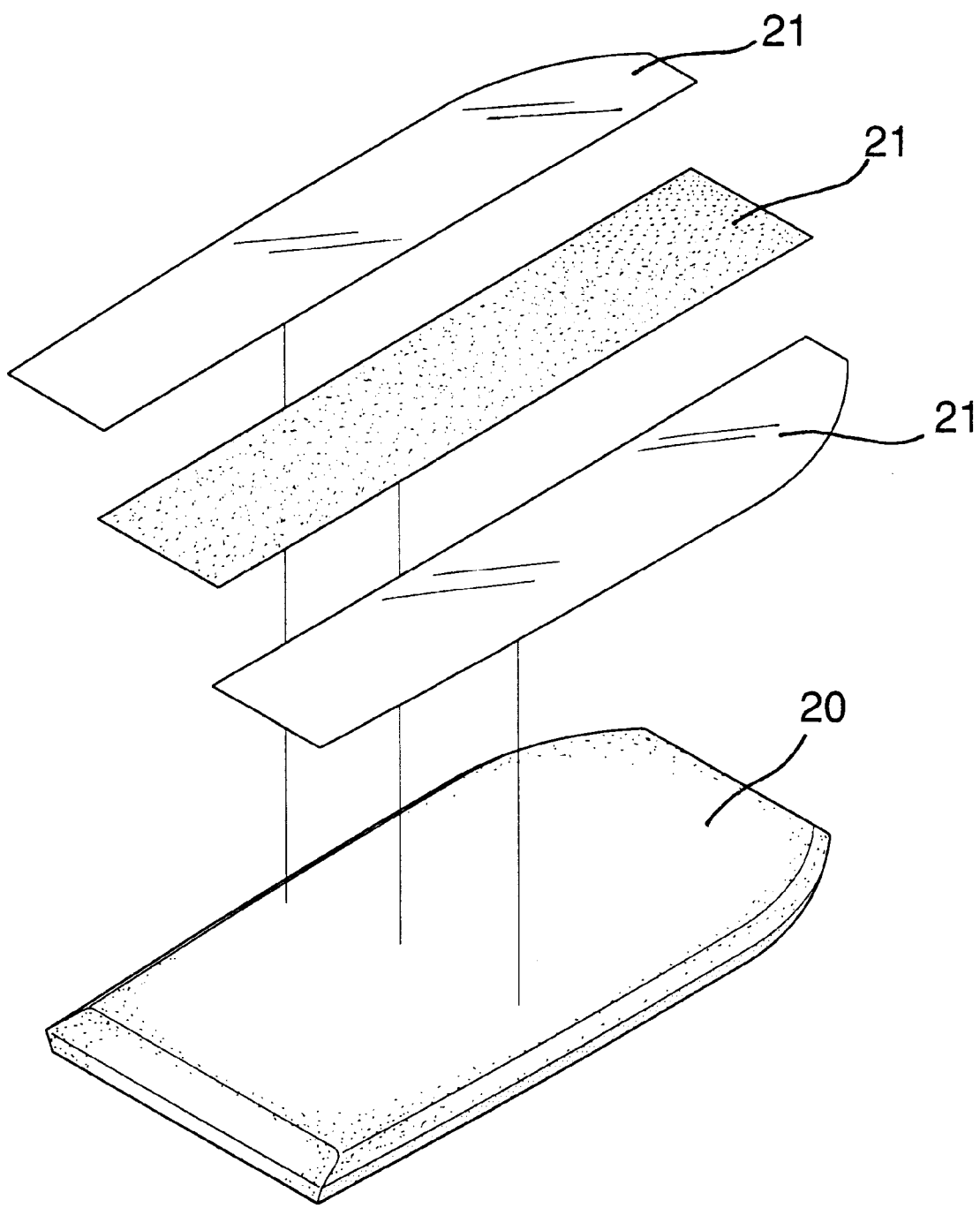
FIG. 6 is an exploded view of three protection layers and the bodyboard in accordance with the present invention.
Figure 7:
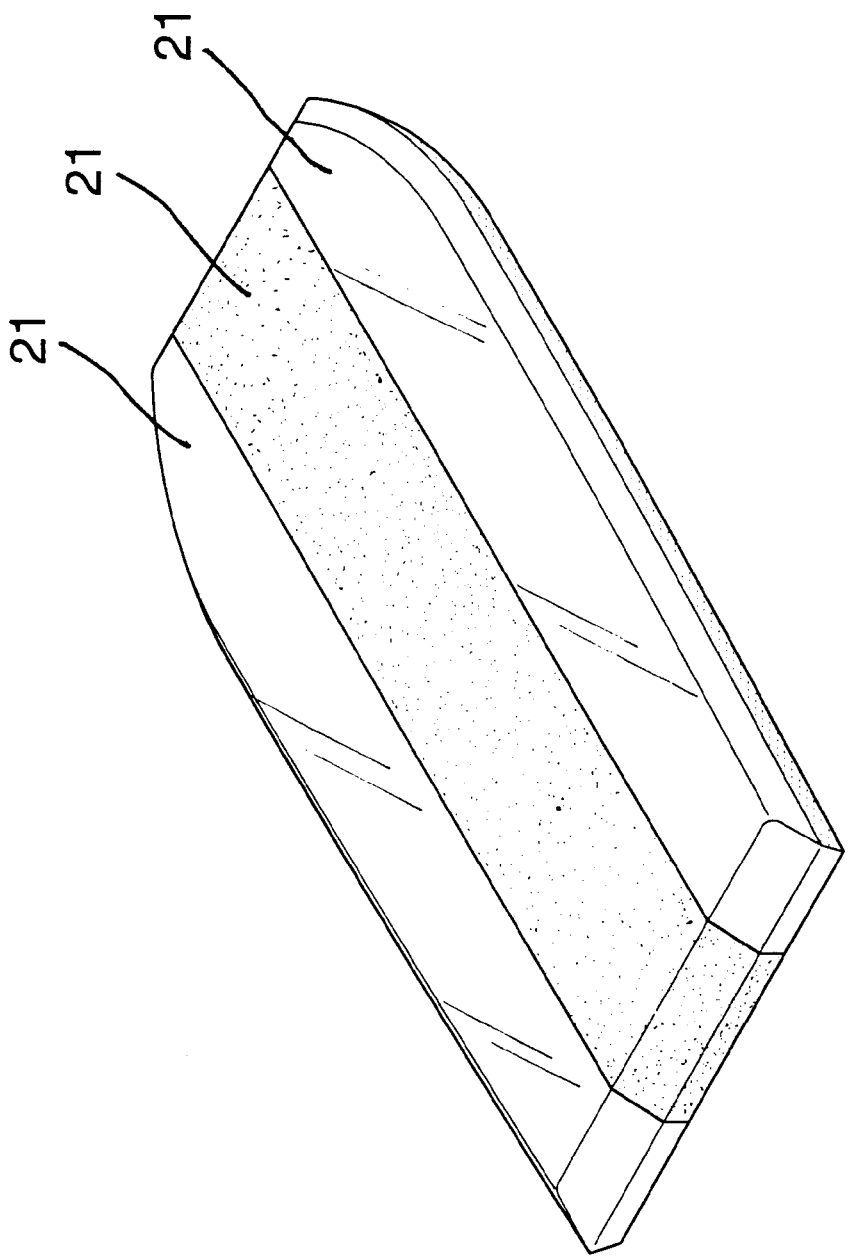
FIG. 7 is a perspective view of the bodyboard as shown in FIG. 6.
Figure 8:
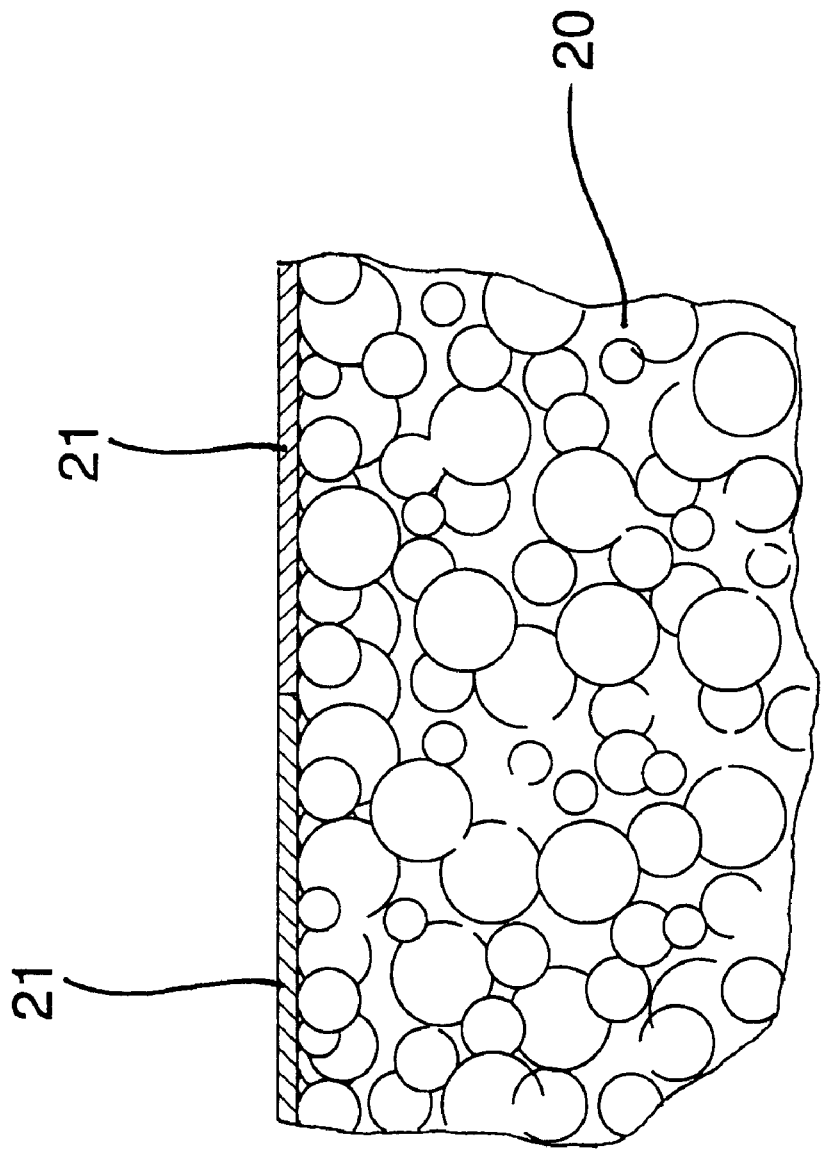
FIG. 8 is a partial cross-sectional view to show the protection layers on the board as shown in FIG. 7.

Referring to FIGS. 6 to 8, the protection layer 21 can be made to be three separated strips which have different colors and the three strips are then heat-laminated on the top of the bodyboard 20. Because the protection layer 21 is a plastic layer and they are heat-laminated on the top of the bodyboard 20 by way of heat-laminating so that there is no gap at all defined between the adjacent strips.

Figure 9:
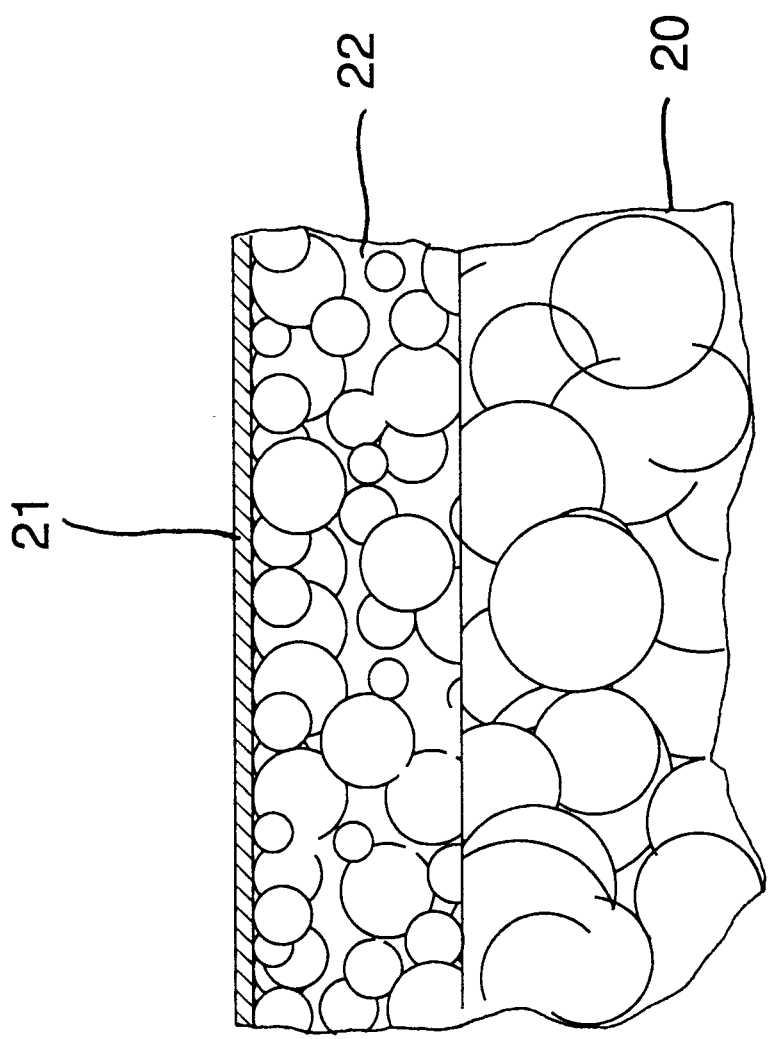
FIG. 9 is a partial cross-sectional view to show a middle layer is connected between the protection layer and the board of the present invention.

FIG. 9 shows another embodiment of the present invention, wherein a middle layer 22 is heat-laminated between the protection layer 21 and the board 20. The middle layer 22 can be made of the same material as the board 20 but has lower foaming rate.

Figure 10:
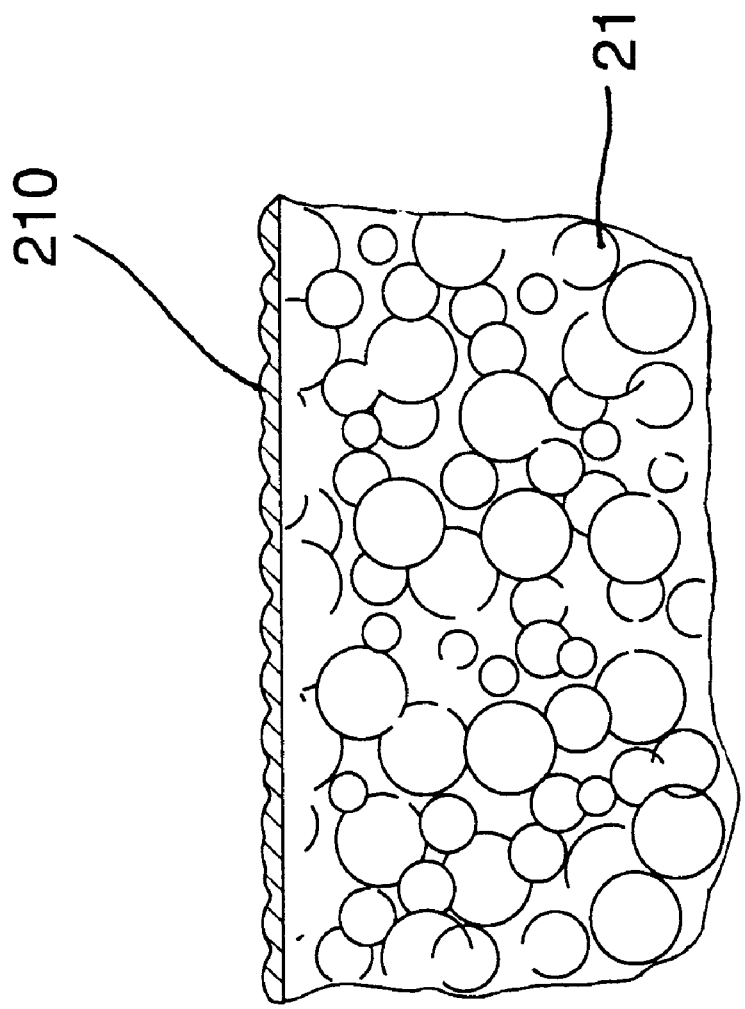
FIG. 10 is a partial cross-sectional view to show the serrated surface of the bodyboard of the present invention.
Figure 11:
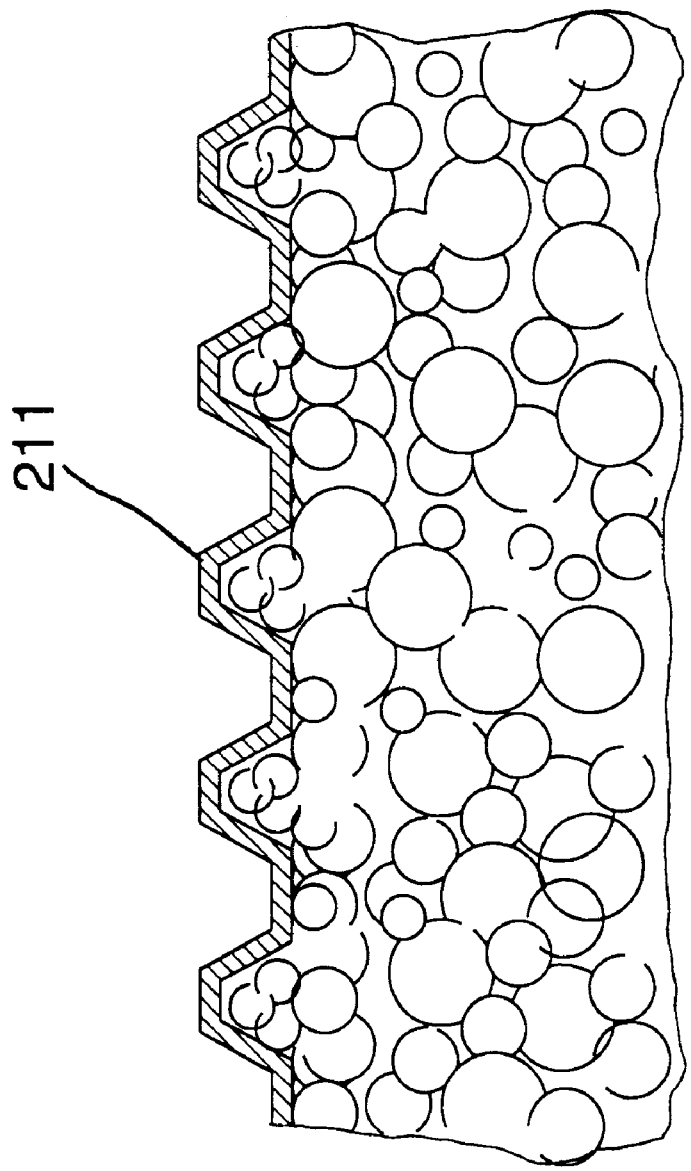
FIG. 11 is a partial cross-sectional view to show parallel flanges extending from the bottom of the bodyboard of the present invention.

Referring to FIGS. 10 and 11, when adhering the protection layer 21 to the board 10, the mold can be designed to have pre-desired patterns. The board 20 may have a serrated surface 210 defined in the outside thereof for example, on the top of the board 10 so as to prevent the bodyboarders/surfers from slipping. The board 20 may also have a plurality of parallel flanges 211 extending from the bottom thereof.

It should be clear to those skilled in the art that further embodiments may be made without departing from the scope and spirit of the present invention.

What is claimed is:

1. A bodyboard comprising:

a board; and a protection layer made of plastic material heat-laminated on the outside of said board, said plastic protection layer being at least 0.01 mm thick and added with ultraviolet inhibitor and anti-oxidant.

2. The bodyboard as claimed in claim 1, wherein said board has a middle layer heat-laminated between said protection layer and the said board.

3. The bodyboard as claimed in claim 1, wherein said board has a serrated surface defined in the outside thereof.

4. The bodyboard as claimed in claim 1, wherein said board has a plurality of parallel flanges extending from one of two sides thereof.

* * * * *